United States Patent
Masugaki et al.

(10) Patent No.: US 6,494,142 B2
(45) Date of Patent: Dec. 17, 2002

(54) CARRIAGE CONVEYOR

(75) Inventors: Mitsuo Masugaki, Shiga (JP); Takaharu Suzuki, Shiga (JP)

(73) Assignee: Daifuku Co., Ltd., Osaka (JP)

( * ) Notice: Subject to any disclaimer, the term of this patent is extended or adjusted under 35 U.S.C. 154(b) by 0 days.

(21) Appl. No.: 09/998,709

(22) Filed: Nov. 30, 2001

(65) Prior Publication Data

US 2002/0108530 A1 Aug. 15, 2002

(30) Foreign Application Priority Data

Feb. 14, 2001 (JP) .................................... 2001-036595

(51) Int. Cl.7 ............................................... B61B 13/00
(52) U.S. Cl. .................................... 104/168; 198/465.3
(58) Field of Search .............................. 104/165, 162, 104/163, 168, 173.1; 105/30; 198/465.3

(56) References Cited

U.S. PATENT DOCUMENTS

| | | | | |
|---|---|---|---|---|
| 3,848,535 A | * | 11/1974 | Mitchell | 104/105 |
| 4,285,278 A | * | 8/1981 | Mitchell | 104/121 |
| 5,067,413 A | * | 11/1991 | Kiuchi et al. | 104/168 |
| 5,465,827 A | * | 11/1995 | Nakagawa et al. | 104/168 |
| 5,647,281 A | * | 7/1997 | Kunczynski | 104/119 |
| 6,360,671 B1 | * | 3/2002 | Nakagami | 104/106 |

FOREIGN PATENT DOCUMENTS

| | | |
|---|---|---|
| JP | 02-102865 | 4/1990 |
| JP | 02-209309 | 8/1990 |
| JP | 04-306162 | 10/1992 |
| JP | 07-025441 | 1/1995 |
| JP | 07-033009 | 2/1995 |

* cited by examiner

Primary Examiner—Mark T. Le
(74) Attorney, Agent, or Firm—Schweitzer Cornman Gross & Bondell LLP (57) ABSTRACT

A conveyor comprises a plurality of carriages 2, each including a deck 7 having a friction surface 20a for a primary drive, which is formed on or near one side of the deck 7, and is parallel to the direction in which the carriages travel. Each carriage also includes a bar 10 fitted on the underside of the deck 7 and extending on the centerline of the deck. The bar 10 has a friction surface 21a for a secondary drive. The travel path includes a linear primary travel line 1 and a secondary travel line 5 for carriage return. A primary drive 3, is arranged for contact with the friction surfaces 20a. The secondary travel line 5 is fitted with a plurality of drives 6A and 6B at intervals, for secondary propulsion in the return direction.

3 Claims, 6 Drawing Sheets

CARRIAGE CONVEYOR

FIELD OF THE INVENTION

The present invention relates to a conveyor including a travel path fitted with a friction drive for propelling a carriage supported in such a manner that the carriage can run on the travel path.

BACKGROUND OF THE INVENTION

A carriage conveyor of this type includes a linear travel path for carriages, which is used as a means of constant-speed continuous conveyance in an assembly process for cars or the like. Each of the carriages includes a deck having a pair of side faces in parallel with the direction in which the carriages run. The drive for propelling the carriages on the linear travel path consists of frictional surfaces for drive and a friction drive wheel for carriage propulsion. The frictional surfaces are the side faces of the carriage decks. The drive wheel is located at the rear (start) end of a conveying path and engages compressively with the frictional surfaces. Each of the carriages pushes the preceding one.

The carriage conveyor also includes a return travel path for returning the carriages from the front end of the linear travel path to the rear end thereof. The front end of the linear travel path is connected to the rear (start) end of the return travel path by an outlet return path. The front end of the return travel path is connected to the rear end of the linear travel path by an inlet return path. Each of the outlet and inlet return paths may need to include a right-angle lateral travel path, which is fitted with turntables at both ends to turn the carriages. Alternatively, each of the outlet and inlet return paths may need to be fitted with a traverser on which a turntable for turning the carriages is mounted. This greatly increases the cost of equipment for turning the carriages.

SUMMARY OF THE INVENTION

The object of the present invention is to provide a carriage conveyor that can overcome the foregoing problem.

A carriage conveyor according to the present invention comprises a carriage travel path and a plurality of carriages. Each of the carriages includes a deck having a frictional surface for primary drive that is a side face formed on or near at least one of the right and left sides of the deck. The frictional surface is parallel to the direction in which the carriage travels. Each of the carriages further includes a bar fitted on the underside of its deck. The bar extends on the centerline of the deck. The centerline is parallel to the running direction. The bar has a side face forming a frictional surface for secondary drive. The carriage travel path includes a primary travel line and a secondary travel line. The primary travel line is a linear travel path, which is fitted with a drive for primary propulsion. This drive includes a friction drive wheel for compressive contact with the frictional surfaces for primary drive of the carriages. The secondary travel line is fitted with a plurality of drives for secondary propulsion, each of which includes a friction drive wheel for compressive contact with the frictional surfaces for secondary drive of the carriages. These drives for secondary propulsion are provided at intervals in the running direction.

On the primary travel line, which is a linear travel path, it is possible to strongly propel the carriages by the conventional method by frictionally driving their decks, which have sufficient strength. On the secondary travel line, it is possible to frictionally drive the carriages by using the frictional surfaces of the bars on the decks. The secondary travel line may include a curved travel path. When the carriages run on this curved travel path, the loci of their frictional surfaces for secondary drive do not deviate greatly from it. This makes it possible to propel the carriages smoothly along the curved travel path by merely constructing the friction drive wheel for compressive contact with the frictional surfaces for secondary drive in such a manner that this wheel can move to some extent laterally of the secondary travel line.

The primary travel line, which is a linear travel path, can be used for the heavy-load carriages loaded with articles. It is possible to freely, as the need arises, design the layout of the curved travel path, where it would be difficult to propel the carriages smoothly by means of a friction drive for use with the primary travel line. However, it is impossible in terms of strength to apply great frictional driving force in the secondary travel line. Therefore, the secondary travel line can be used as a return travel line for the unloaded light-load carriages. This return travel line may include a curved travel path incorporated suitably in it for turning the carriages while they are running. This removes the necessity for a turntable for turning the carriages or a traverser on which such a turntable is mounted. It is consequently possible to greatly reduce the cost for the whole equipment.

The drive for primary propulsion may be located at the rear (start) end of the primary travel line. The front end of the primary travel line may be fitted with a brake for preventing the carriages from running at a speed higher than a predetermined speed. The carriages conveyed into the primary travel line are propelled in order by the drive for primary propulsion at the rear end of this line. As a result, a train of carriages is present on the whole primary travel line, where all of them run at a constant speed, each of them pushing the preceding one. This makes it possible to use the primary travel line as a car assembly line or the like.

The bar on the underside of the deck of each carriage may be a middle bar fixed to a middle portion of the centerline of the deck. A front bar and a rear bar may be connected horizontally pivotally to the front and rear ends, respectively, of the middle bar. The front and rear bars do not protrude from the front and rear ends, respectively, of the deck. The bars form a bendable frictional surface for secondary drive on side faces thereof, which extends over substantially the whole length of the deck. A guide rail may be laid along the travel lines. Both ends of the middle bar and the free ends of the front and rear bars may each support a trolley in engagement with the guide rail. This makes it possible to shorten the radius of curvature of the curved travel path of the secondary travel line, and to lengthen the intervals between the drives for secondary propulsion on this line, further reducing the cost of equipment.

The specific structure and operation of the present invention will be understood easily from a preferred embodiment of the invention, which will be described below with reference to the accompanying drawings.

PREFERRED EMBODIMENT OF THE INVENTION

Figure 1:
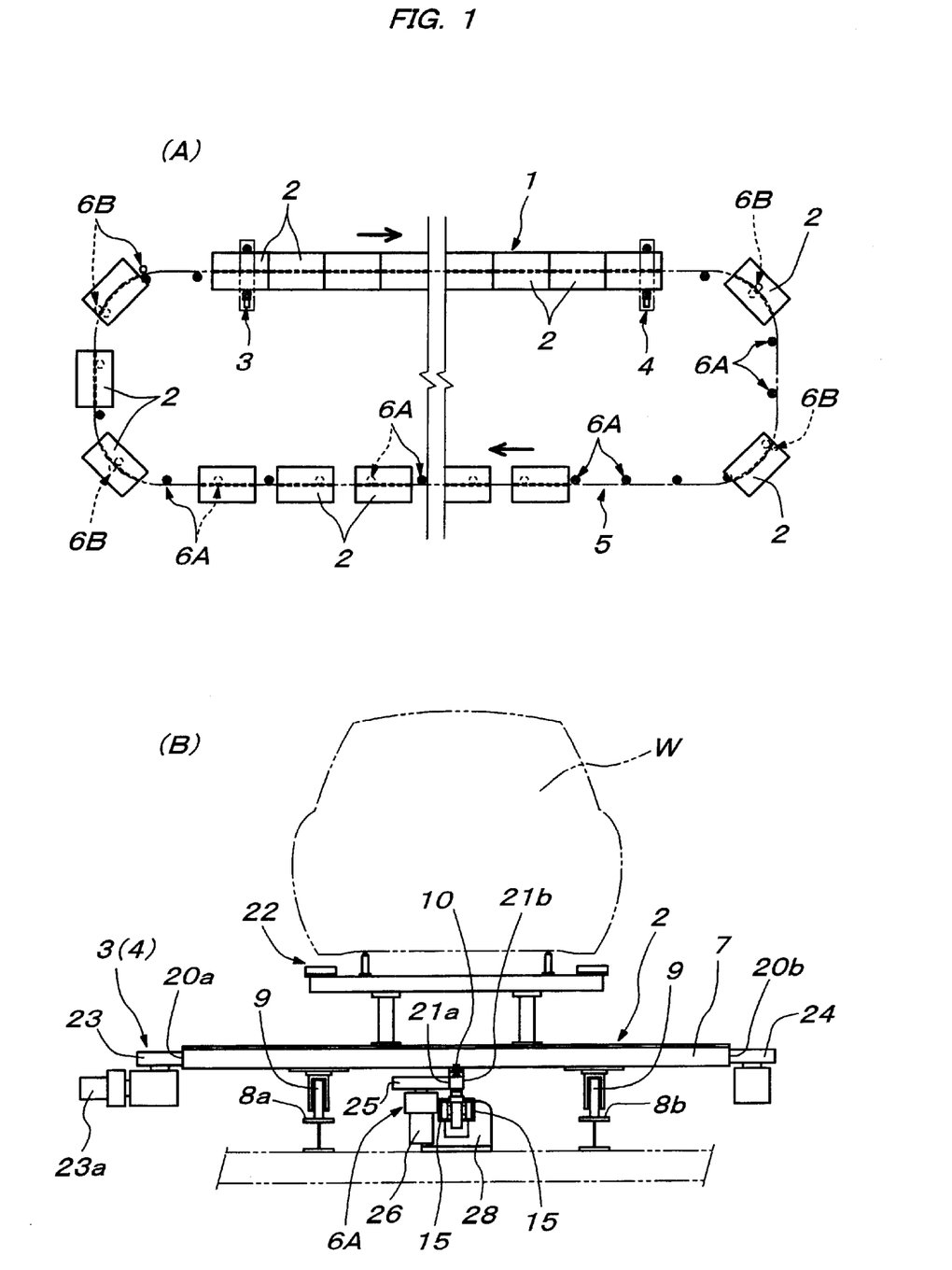
FIG. 1A is a schematic plan view showing a layout of a carriage travel line.
FIG. 1B is a front view showing a carriage on a primary travel line and its drive for primary propulsion.

With reference to FIG. 1A, a primary travel line 1 for an assembly process is a linear travel path. The rear (start) end of the travel line 1 is fitted with a drive 3 for primary propulsion for propelling a carriage 2 forward. The front end of the travel line 1 is fitted with a brake 4 for preventing a carriage 2 from running at a speed higher than a predetermined speed. A secondary travel line 5 extends for returning a carriage 2 from the front end to the rear end of the primary travel line 1. The secondary travel line 5 is fitted with drives 6A and 6B for secondary propulsion at intervals shorter than the whole length of a carriage 2. These drives 6A and 6B each propel carriages 2 one after one forward at a high speed.

Figure 2:
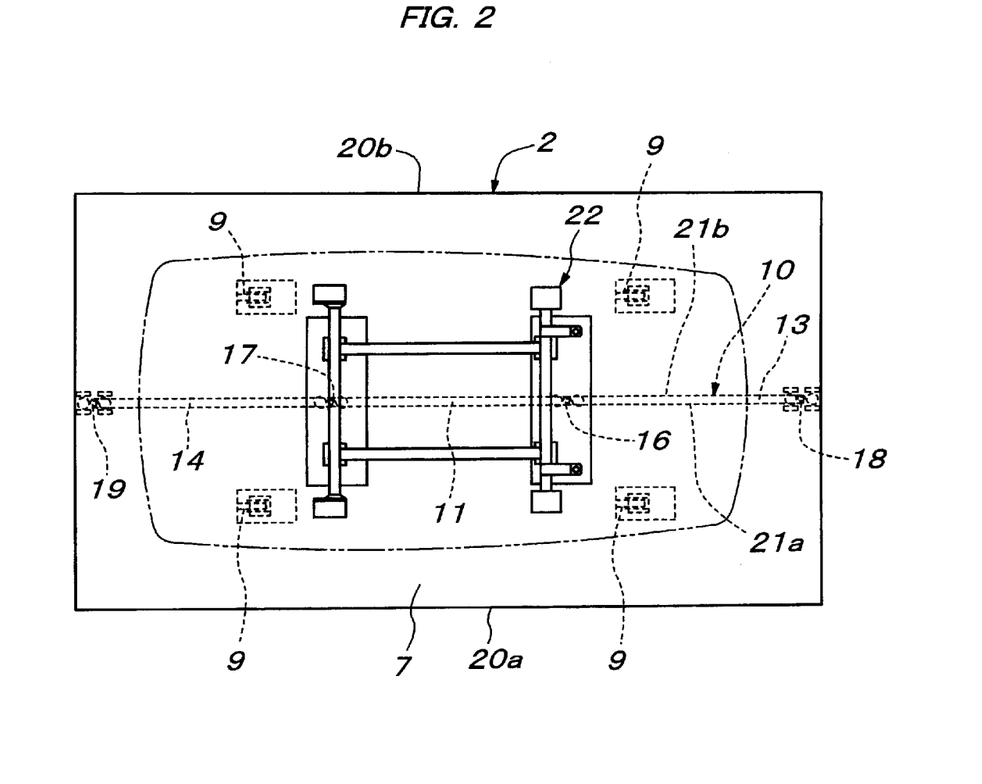
FIG. 2 is a plan view of the carriage.
Figure 3:
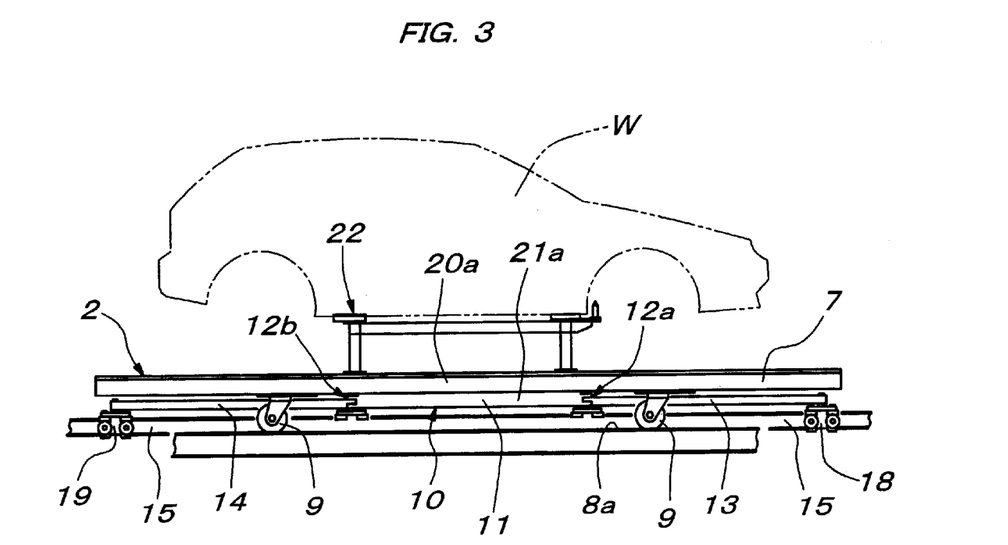
FIG. 3 is a side view partially in longitudinal section, showing the carriage on the travel line.

As shown in FIGS. 1B, 2 and 3, each carriage 2 includes a rectangular deck 7 longer in the running direction. The underside of the deck 7 is fitted with a front pair and a rear pair of free wheels 9, and a bar assembly 10 for friction drive. Each pair of free wheels 9 consists of a right wheel and a left wheel. The wheels 9 roll on a pair of flat guide rails 8a and 8b, which are H beams laid along the travel lines 1 and 5 on a floor. Alternatively, the wheels 9 could roll directly on the floor in place of the rails 8a and 8b. The bar assembly 10 consists of a middle bar 11, a front bar 13 and a rear bar 14. The middle bar 11 extends on the longitudinally extending centerline of the deck 7. The length of this bar 11 is about ⅓ of the whole length of the deck 7. One end of the front bar 13 is connected to the front end of the middle bar 11 by a connector 12a in such a manner that the front bar can pivot horizontally on a vertical axis. One end of the rear bar 14 is connected to the rear end of the middle bar 11 by a connector 12b in such a manner that the rear bar can pivot horizontally on a vertical axis. The front and rear ends of the middle bar 11, the front end of the front bar 13 and the rear end of the rear bar 14 are fitted with trolleys 16, 17, 18 and 19, respectively, on their underside. The trolleys 16–19 engage with a pair of trolley guide rails 15, which are laid side by side midway between the flat guide rails 8a and 8b.

Figure 4:
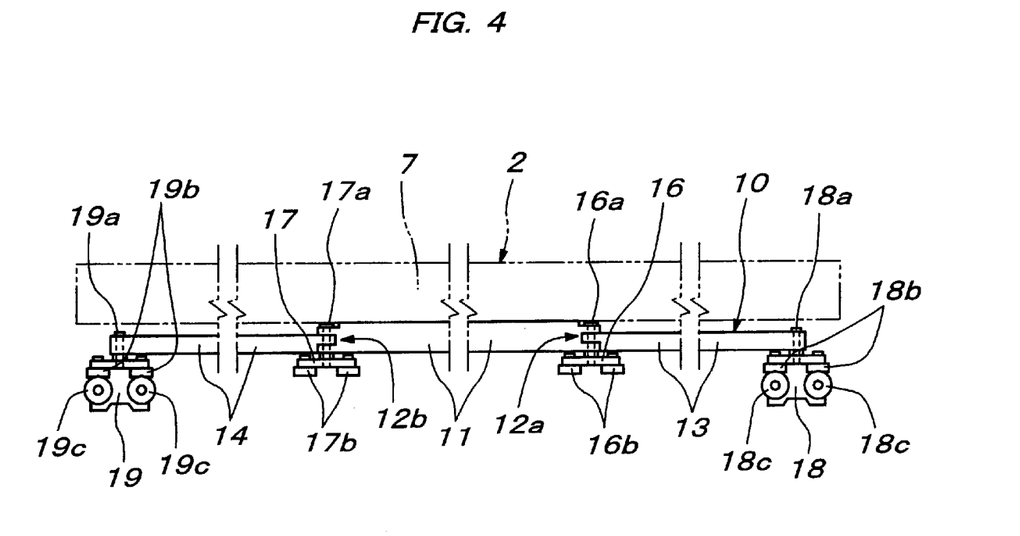
FIG. 4 is a side view partially broken, showing a bar assembly for friction drive, which forms a frictional surface for secondary drive of the carriage.

As shown in FIG. 4, the bar connectors 12a and 12b include vertical pivot shafts 16a and 17a, respectively. The front and rear bars 13 and 14 can pivot around the shafts 16a and 17a, respectively, on which the trolleys 16 and 17, respectively, are supported rotatably. The trolley 16 includes a pair of vertical-axis rollers 16b. The trolley 17 includes a pair of vertical-axis rollers 17b. The rollers 16b and 17b are positioned between the trolley guide rails 15 so that the rollers engage loosely with the rails. The free ends of the front and rear bars 13 and 14 are fitted with vertical pivot shafts 18a and 19a, respectively, on which the trolleys 18 and 19, respectively, are supported rotatably. The trolley 18 includes a pair of vertical-axis rollers 18b and two pairs of horizontal-axis rollers 18c. The trolley 19 includes a pair of vertical-axis rollers 19b and two pairs of horizontal-axis rollers 19c. The horizontal axis of the rollers 18c is parallel with that of the rollers 19c. The vertical-axis rollers 18b and 19b are positioned between the trolley guide rails 15 so that the rollers engage loosely with the rails. Each pair of horizontal-axis rollers 18c engages with one of the trolley guide rails 15. Likewise, each pair of horizontal-axis rollers 19c engages with one of the rails 15.

The right and left side faces of each deck 7 function as a pair of frictional surfaces 20a and 20b, respectively, for primary drive. The right and left side faces of the bar assembly 10 for friction drive function as a pair of frictional surfaces 21a and 21b, respectively, for secondary drive, which can bend horizontally. The whole length of the bar assembly 10, which is the distance between the trolleys 18 and 19, is a little shorter than the whole length of the deck 7 so that the assembly does not protrude from the deck ends. Each deck 7 is fitted with a support 22 on its top for supporting an article W in a fixed position.

As shown in FIG. 1B, the drive 3 for primary propulsion includes a friction drive wheel 23 and a back-up roller 24 for compressive contact with the frictional surfaces 20a and 20b, respectively, of the deck 7. The drive wheel 23 can be driven by an electric motor 23a. Alternatively, no back-up roller 24 might be used, and a motor-driven friction drive wheel 23 might be used for compressive contact with each or one of the frictional surfaces 20a and 20b. The brake 4 may be identical in structure with the drive 3. In this case, the drive wheel 23 of the brake 4 needs driving at a little lower peripheral speed than the drive wheel 23 of the drive 3. In place of the brake 4 including a friction drive wheel 23, of course, only a braking friction wheel not driven by a motor might be used for compressive contact with one or each of the frictional surfaces 20a and 20b.

Figure 5:
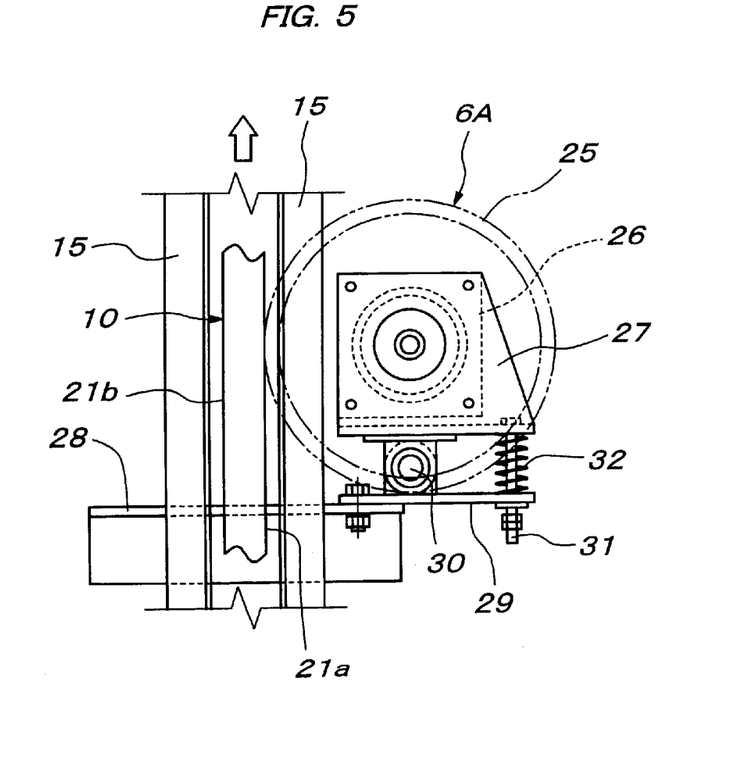
FIG. 5 is a plan view showing a drive for secondary propulsion that is used on a linear travel path.
Figure 6:
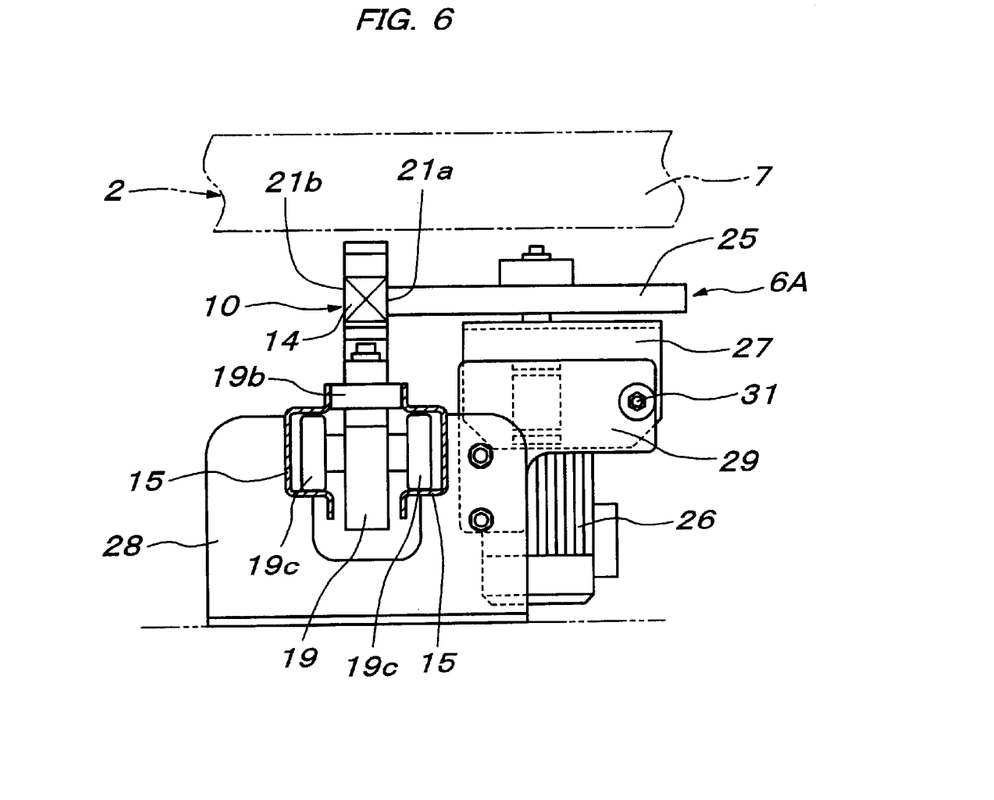
FIG. 6 is a rear view partially in longitudinal section, showing the drive for secondary propulsion of FIG. 5.
Figure 7:
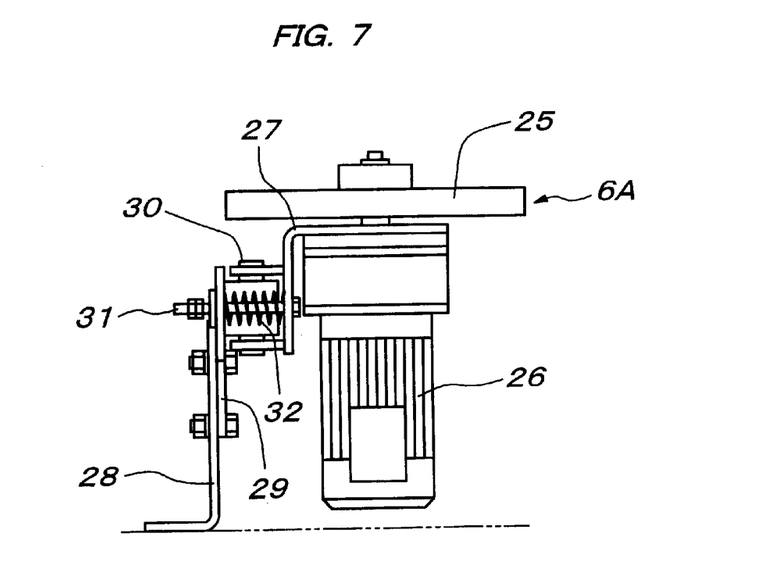
FIG. 7 is a side view showing the drive for secondary propulsion of FIG. 5.

The drives 6A for secondary propulsion are provided on the other linear travel paths for the carriages 2. The other drives 6B for secondary propulsion are provided on the curved travel paths for the carriages 2. As shown in FIGS. 5–7, each drive 6A includes a motor-driven friction drive wheel 25 for compressive contact with the frictional surfaces 21a of the bar assemblies 10 of the carriages 2. The wheel 25 is fixed to the output shaft of an electric motor 26, which is supported on a motor support 27. The motor support 27 is supported pivotally on a vertical pivot shaft 30, which is supported by a base plate 29. The motor support 27 is urged by a compression spring 32 to bring the wheel 25 into compressive contact with the frictional surfaces 21a. The base plate 29 is fixed to a rail support 28, which is fixed to the floor. The rail supports 28 for the drives 6A are provided at intervals to support the trolley guide rails 15. The pivoting range of the motor support 27 is limited by a stopper bolt 31, which is interposed between this support 27 and the base plate 29. Part of the bolt 31 is surrounded by the spring 32.

Figure 8:
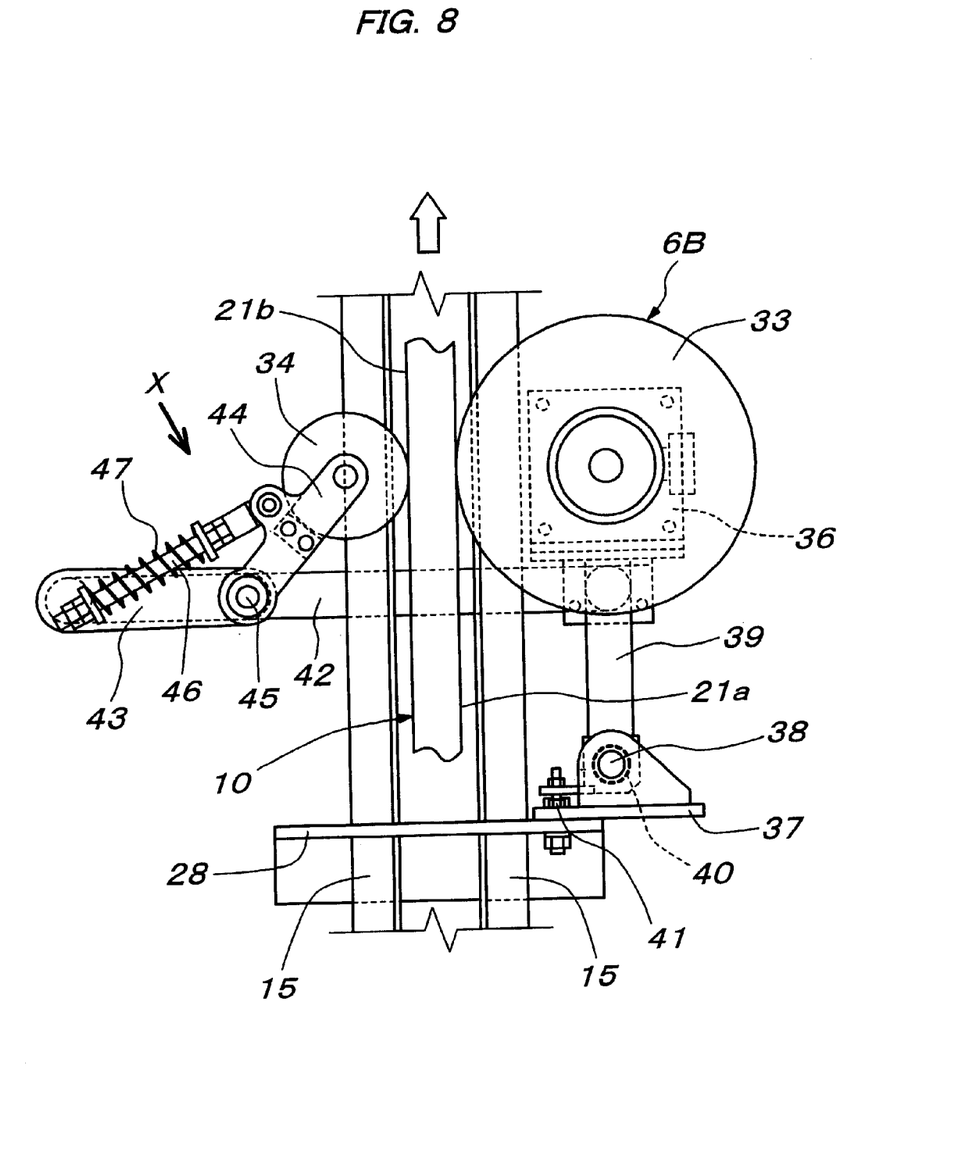
FIG. 8 is a plan view showing a drive for secondary propulsion that is used on a curved travel path.
Figure 9:
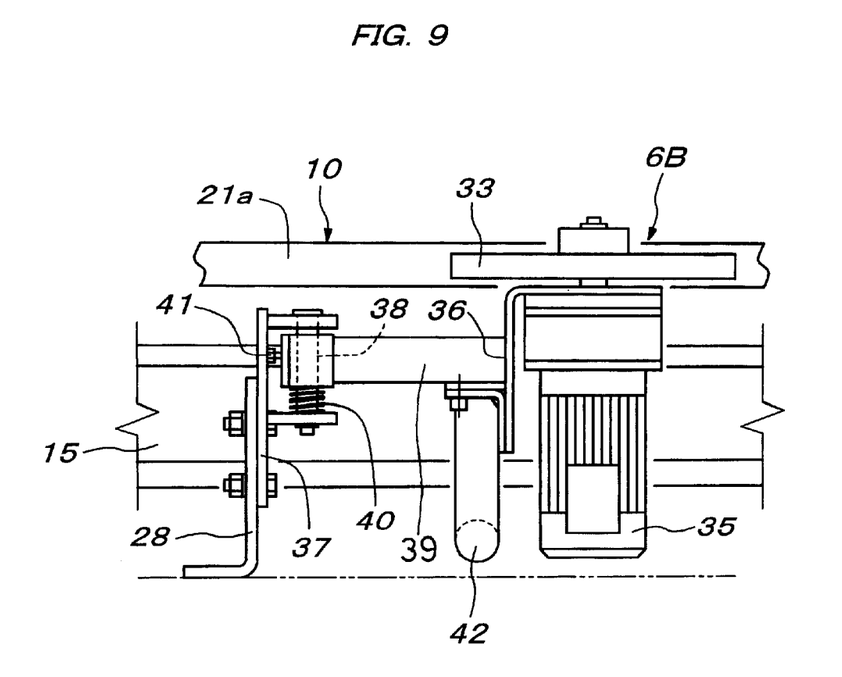
FIG. 9 is a side view showing the drive for secondary propulsion of FIG. 8.
Figure 10:
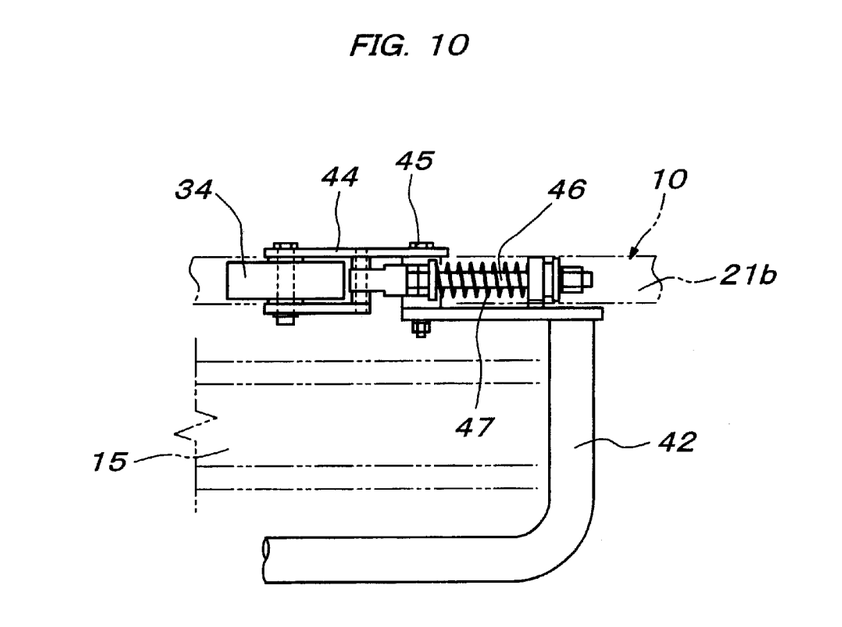
FIG. 10 is a view taken in the direction X of FIG. 8.

As shown in FIGS. 8–10, each drive 6B for secondary propulsion includes a motor-driven friction drive wheel 33 for compressive contact with the frictional surfaces 21a of the bar assemblies 10 of the carriages 2. Each drive 6B also includes a back-up roller 34 for compressive contact with the other frictional surfaces 21b of the bar assemblies 10. The drive wheel 33 is fixed to the output shaft of an electric motor 35, which is supported on a motor support 36. The motor support 36 includes a horizontal arm 39 fixed to it at one end. The other end of this arm 39 is supported pivotally on a vertical pivot shaft 38 and has a stopper 41 fixed to it. The pivot shaft 38 is supported by a base plate 37, which is fixed to a rail support 28. The rail support 28 is fixed to the floor. Likewise, the rail supports 28 for the drives 6B are provided at intervals to support the trolley guide rails 15.

Part of the pivot shaft 38 is surrounded by a torsion spring 40, which is interposed between the motor support 36 and the base plate 37. The spring 40 urges the motor support 36 to bring the drive wheel 33 into compressive contact with the frictional surfaces 21a. The stopper 41 limits the pivotal movement of the urged support 36 by contacting with the base plate 37.

Fixed to the motor support 36 is one end of a U-shaped arm 42, which extends from one side of this support under the trolley guide rails 15. Fixed to the other end of this arm 42 is one end of a horizontal support plate 43. The other end of this support plate 43 supports a vertical pivot shaft 45, on which a horizontal lever 44 is supported pivotally. The back-up roller 34 is supported rotatably by the free end of the lever 44. The pivoting range of the lever 44 is limited by a bolt 46, which is interposed between the lever 44 and the support plate 43. Part of the bolt 46 is surrounded by a compression spring 47, which urges the lever 44 to bring the roller 34 into compressive contact with the frictional surfaces 21b for secondary drive.

The flat guide rails 8 of the primary and secondary travel lines 1 and 5 support the free wheels 9 of the carriages 2. The middle bar 11 of the bar assembly 10 of each carriage 2 is fixed to the associated deck 7. The front and rear ends of this fixed bar 11 engage through the trolleys 16 and 17, respectively, with the guide rails 15. This allows the carriages 2 to move only along these rails 15. Likewise, the free ends of the bars 13 and 14, which are connected to the front and rear ends, respectively, of the middle bar 11, engage through the trolleys 18 and 19, respectively, with the guide rails 15. This keeps the bar assembly 10 in a position along the guide rails 15.

When each carriage 2 is conveyed into the rear (start) end of the primary travel line 1, its deck 7 is positioned between the motor-driven friction drive wheel 23 and the back-up roller 24 of the drive 3 for primary propulsion. Then, the carriage 2 is propelled at a predetermined speed by the friction between the frictional surface 20a for primary drive of the deck 7 and the drive wheel 23. In this way, the drive 3 propels a series of carriages 2 on the travel line 1. When the leading carriage 2 of the series is positioned between the friction drive wheel 23 and the back-up roller 24 of the brake 4, this carriage 2 is kept at a lower speed than the last carriage 2 propelled by the drive 3. This causes each of the carriages 2 on the travel line 1 between the drive 3 and the brake 4 to drive the preceding carriage 2 with their decks 7 in end-to-end contact. Thus, a train of carriages 2 is present on the whole travel line 1, where they travel together in series at a constant speed. Consequently, the primary travel line 1 can be used as an assembly line for assembling the articles W supported on the supports 22 of the carriages 2.

The carriages 2 pushed out of the front end of the primary travel line 1 enter the secondary travel line 5, where they are driven at a high speed by the drives 6A and 6B for secondary propulsion so as to run separately at intervals on this line 5 until they return to the rear end of the primary travel line 1. When each carriage 2 is located on each linear travel path of the secondary travel line 5, the linearly continuous, frictional surface 21a of the bar assembly 10 on the underside of the deck 7 of the carriage 2 comes into compressive contact with the friction drive wheel 25 of at least one drive 6A for secondary propulsion. The drive wheel 25 is driven by the associated motor 26 to propel the carriage 2 at a predetermined speed. When each carriage 2 is located on each curved travel path of the secondary travel line 5, the frictional surface 21a of the bar assembly 10, which can bend along the guide rails 15, comes into contact with the friction drive wheel 33 of at least one drive 6B for secondary propulsion. The drive wheel 33 is driven by the associated motor 35 to propel the carriage 2 at the predetermined speed.

The friction drive wheel 25 of each drive 6A for secondary propulsion is normally held in a predetermined position by the associated stopper bolt 31 and compression spring 32. The bar assembly 10 of each carriage 2 retracts the drive wheel 25 outward against the compressive force of the spring 32. The reaction force of the spring 32 brings the drive wheel 25 into compressive contact with the frictional surface 21a of the bar assembly 10.

The friction drive wheel 33 of each drive 6B for secondary propulsion is normally held in a predetermined position by the associated stopper 41 and torsion spring 40. The associated back-up roller 34 is normally held in a predetermined position by the associated bolt 46 and compression spring 47. Normally, the space between the drive wheel 33 and the back-up roller 34 is narrower than the width of the bar assembly 10 of each carriage 2. The bar assembly 10 moves through the narrow space between the drive wheel 33 and the back-up roller 34, retracting this roller 34 outward against the compressive force of the spring 47. The reaction force of the spring 47 brings the drive wheel 33 into compressive contact with the frictional surface 21a of the bar assembly 10. The drive wheel 33 and the back-up roller 34 can move inward of the associated curved travel path of the secondary travel line 5 against the torsional force of the spring 40.

When the carriage 2 runs on the curved travel path, the bar assembly 10 bends in such a manner that its middle portion shifts to the inside of this path. The friction drive wheel 33 and the back-up roller 34 between which the bending bar assembly 10 is sandwiched move together around the associated pivot shaft 38 against the torsional force of the spring 40. This causes the carriage 2 to be propelled reliably on the curved travel path without lowering the compressive force of the drive wheel 33 on the frictional surface 21a of the bar assembly 10.

FIG. 1A shows an example of the layout of the whole travel line for the carriages 2. The layout could be designed suitably for various purposes. The travel line might be fitted with a lifting gear for lifting and lowering the carriages 2 to change their running level or load and unload them. The travel line might include a branch line. It is preferable that the frictional surfaces 20a and 20b for primary drive of the deck 7 of each carriage 2 be the right and left side faces of the deck. Alternatively, the frictional surfaces 20a and 20b might be side faces of other members extending near and in parallel to the right and left sides of the deck 7.

What is claimed is:

1. A carriage conveyor comprising:
    a plurality of carriages each including a deck having a frictional surface for primary drive that is a side face formed on or near at least one of the right and left sides of the deck, the frictional surface being parallel to the direction in which the carriages travel;
    each of the carriages further including a bar fitted on the underside of the deck, the bar extending on the center line of the deck, the center line being parallel to the running direction, the bar having a side face forming a frictional surface for secondary drive; and
    a carriage travel path including a primary travel line as a linear travel path and a secondary travel line, the primary travel line being fitted with a drive for primary propulsion including a friction drive wheel for compressive contact with the frictional surfaces for primary drive of the carriages, the secondary travel line being fitted with a plurality of drives for secondary propulsion each including a friction drive wheel for compressive contact with the frictional surfaces for secondary drive of the carriages, the drives for secondary propulsion being provided at intervals in the running direction.

2. The carriage conveyor defined in claim 1, wherein the drive for primary propulsion is located at the rear end of the primary travel line, the primary travel line being further fitted with a brake for preventing the carriages from running at a speed higher than a predetermined speed, the brake being located at the front end of the primary travel line;

at least two of the carriages being driven in end-to-end contact on the whole primary travel line by the drive for primary propulsion.

3. The carriage conveyor defined in claim 1, wherein the bar is fixed to a middle portion of the centerline of the deck;

each of the carriages further including a front bar and a rear bar that are connected horizontally pivotally to the front and rear ends, respectively, of the first-mentioned bar, the front and rear bars not protruding from the front and rear ends, respectively, of the deck, the bars forming a bendable frictional surface for secondary drive extending over substantially the whole length of the deck;

the carriage travel path further including a guide rail laid along the travel lines;

each of the carriages also including a plurality of trolleys in engagement with the guide rail, each of the trolleys being supported by one of both ends of the first-mentioned bar and the free ends of the front and rear bars.

\* \* \* \* \*